(12) United States Patent
Jeffay et al.

(10) Patent No.: US 7,447,209 B2
(45) Date of Patent: Nov. 4, 2008

(54) METHODS, SYSTEMS, AND COMPUTER PROGRAM PRODUCTS FOR MODELING AND SIMULATING APPLICATION-LEVEL TRAFFIC CHARACTERISTICS IN A NETWORK BASED ON TRANSPORT AND NETWORK LAYER HEADER INFORMATION

(75) Inventors: Kevin Jeffay, Chapel Hill, NC (US); Felix Hernandez-Campos, Chapel Hill, NC (US); Frank Donelson Smith, Chapel Hill, NC (US); Andrew B. Nobel, Chapel Hill, NC (US)

(73) Assignee: The University of North Carolina, Chapel Hill, NC (US)

( * ) Notice: Subject to any disclaimer, the term of this patent is extended or adjusted under 35 U.S.C. 154(b) by 637 days.

(21) Appl. No.: 11/075,992

(22) Filed: Mar. 9, 2005

(65) Prior Publication Data

US 2006/0083231 A1 Apr. 20, 2006

Related U.S. Application Data

(60) Provisional application No. 60/551,559, filed on Mar. 9, 2004.

(51) Int. Cl.
*H04L 12/28* (2006.01)
(52) U.S. Cl. .................. 370/392; 370/394; 370/254; 709/224
(58) Field of Classification Search .................. None
See application file for complete search history.

(56) References Cited

U.S. PATENT DOCUMENTS 6,597,661 B1 7/2003 Bonn

| | | | |
|---|---|---|---|
| 2002/0141393 A1* | 10/2002 | Eriksson et al. | 370/352 |
| 2003/0086425 A1 | 5/2003 | Bearden et al. | |
| 2003/0088664 A1 | 5/2003 | Hannel et al. | |
| 2003/0179777 A1 | 9/2003 | Denton et al. | |
| 2004/0117474 A1 | 6/2004 | Ginkel et al. | |
| 2004/0240387 A1 | 12/2004 | Nuzman et al. | |
| 2006/0239273 A1* | 10/2006 | Buckman et al. | 370/395.41 |

OTHER PUBLICATIONS

Hernandez-Campos et al., "Generating Realistic TCP Workloads," Proceedings of the Computer Measurement Group's 2004 International Conference, pp. 1-12 (Dec. 2004).

(Continued)

*Primary Examiner*—Duc C Ho
(74) *Attorney, Agent, or Firm*—Jenkins, Wilson, Taylor & Hunt, P.A.

(57) ABSTRACT

Methods, systems, and computer program products are disclosed for determining application-level traffic characteristics in a network based on transport and network layer header information. Transport and network layer header information is collected from packet traffic in a network. Packets are classified to different connections based on the transport and network layer header information. Each connection is modeled using an abstract syntax for characterizing bidirectional interactions between endpoints of each connection and delays between the interactions. Application-level characteristics of the packet traffic are determined based on the modeled connections. Simulated traffic that models application-level traffic behavior in a real network may also be generated by simulating traffic connections based on the modeled connections.

34 Claims, 11 Drawing Sheets

OTHER PUBLICATIONS

Hernandez-Campos et al., "How 'Real' Can Synthetic Network Traffic Be?," ACM SIGCOMM'04, pp. 1-20 (Aug. 2004).

Jeffay, "How 'Real' Can Synthetic Network Traffic Be?" colloquium presented at the University of Virginia, pp. 1-2 (Mar. 15, 2004).

Grant Proposal, NSF Proposal No. 0323648 funded Jul. 1, 2003.

Hernandez-Campos et al., "Statistical Clustering of Internet Communication Patterns," Proceedings of the 35th Symposium on the Interface of Computing Science and Statistics, pp. 1-16 (Jul. 2003).

Smith et al., "What TCP/IP Protocol Headers Can Tell Us About the Web," Proceedings of ACM Sigmetrics 2001/Performance 2001, pp. 1-12 (Jun. 2001).

Notification of Transmittal of the International Search Report and the Written Opinion of the International Searching Authority, or the Declaration for International Application No. PCT/US05/07718 (Jun. 11, 2007).

* cited by examiner

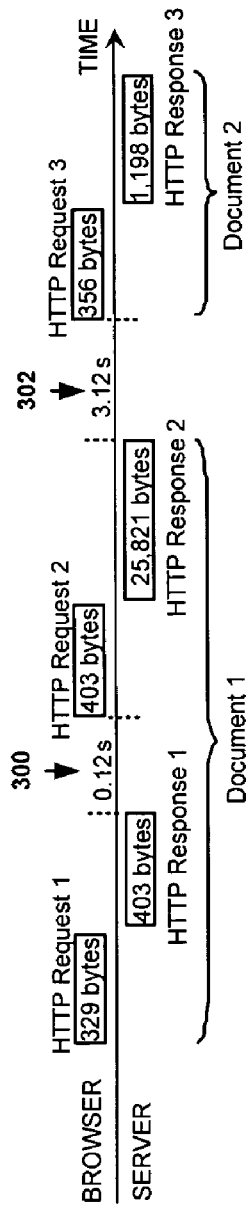
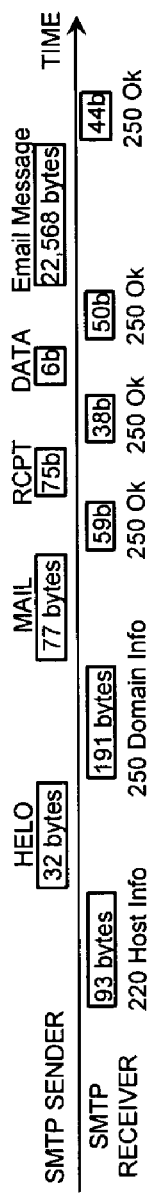
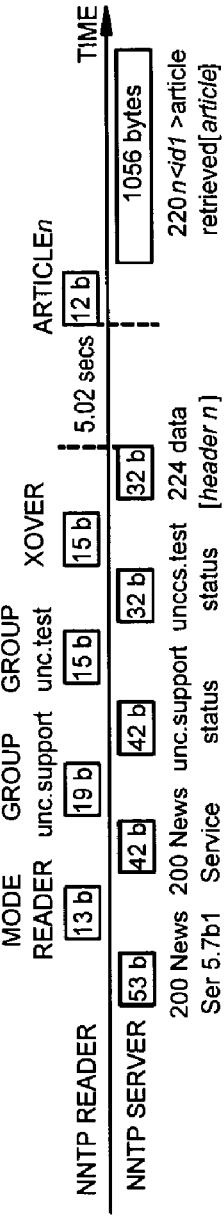
FIG. 3A
FIG. 3B
FIG. 3C

METHODS, SYSTEMS, AND COMPUTER PROGRAM PRODUCTS FOR MODELING AND SIMULATING APPLICATION-LEVEL TRAFFIC CHARACTERISTICS IN A NETWORK BASED ON TRANSPORT AND NETWORK LAYER HEADER INFORMATION

RELATED APPLICATIONS

This application claims the benefit of U.S. Provisional Application No. 60/551,559, filed Mar. 9, 2004, the content of which is incorporated by reference herein in its entirety.

GOVERNMENT INTEREST

This invention was made with U.S. Government support under Grant Nos. ANI 03-23648 and ITR 00-82870, awarded by the National Science Foundation. The U.S. Government has certain rights in the invention.

TECHNICAL FIELD

The subject matter described herein relates to communication network traffic modeling and simulation. More particularly, the subject matter described herein relates to modeling and simulating application-level traffic characteristics for a communications network based on transport and network layer header information.

BACKGROUND

Evaluating the performance of network protocols and mechanisms conventionally requires careful experimentation in simulators and testbed environments. As with any other performance analysis task, a critical element of these experiments is the availability of a realistic workload or set of workloads that can stress the technology in a manner that is representative of the deployment conditions. Despite the increasing availability of measurement results and packet traces from real networks, there is currently no accepted method for constructing realistic workloads. Consequently, networking researchers and performance analysts have relied on simplistic or incomplete models of network traffic for their experiments.

One essential difference between network workloads and other workloads, such those of storage systems, is the closed feedback loop created by the ubiquitous Transport Control Protocol (TCP). This protocol, responsible for the end-to-end delivery of the vast majority of the traffic on the Internet, reacts to network conditions by retransmitting lost packets and adjusting sending rates to the perceived level of congestion in the network. As a consequence, it is not enough to simply collect a trace of packets traversing a network element and replay the trace to conduct experiments, since the new conditions in the experimental environment would have had an effect on the behavior of TCP that is not present in the packet trace. In other words, replaying a packet trace breaks the feedback loop of TCP. For example, it is incorrect to collect a packet trace in a 1-Gbps link with a mean load of 650 Mbps and use it to evaluate a router servicing an optical carrier (OC) link transmitting at 622 Mbps (OC-12), because the replay would not capture the back-off effect of TCP sources as they detect congestion in the overloaded OC link. The analysis of the results of such an experiment would be completely misleading, because the traffic represents a set of behaviors of TCP sources that can never occur in practice. For example, the rate of queue overflow would be much larger in the experiment than in a real deployment where TCP sources would react to congestion and reduce the aggregate sending rate below the original 650 Mbps (thereby quickly reducing the number of drops). In such an scenario, an experiment that included estimating a metric related to response time, for example by looking at the duration of each TCP connection, would result in detecting virtually no difference between the original trace and the replay. In reality, however, the decrease in sending rate by the TCP sources in the congested scenario would result in much longer response times. Thus, valid experiments must preserve the feedback loop in TCP. Traffic generation must be based on some form of closed-loop process, and not on simple open-loop packet-level replays.

The fundamental idea of closed-loop traffic generation is to characterize the sources of traffic that drive the behavior of TCP. In this approach, experimentation generally proceeds by simulating the use of the (simulated or real) network by a given population of users using applications, such as file transfer protocol (FTP) or web browsers. Synthetic workload generators are therefore used to inject data into the network according to a model of how the applications or users behave. This paradigm of simulation follows the philosophy of using source-level descriptions of applications advocated in "Wide area traffic: the failure of Poisson modeling," Floyd et al., IEEE/ACM Transactions on Networking, 3(3):226-244, 1995. The critical problem in doing network simulations is then generating application-dependent, network-independent workloads that correspond to contemporary models of application or user behavior.

The networking community, however, lacks contemporary models of application workloads. More precisely, validated tools and methods to go from measurements of network traffic to the generation of synthetic workloads that are statistically representative of the applications using the network are needed. Current workload modeling efforts tend to focus on one or a few specific applications. One example of a workload modeling method includes modeling web browsers. The status quo today for modeling web workloads uses a set of generators that are based on web-browsing measurements that were conducted several years ago. The web-browser measurements were based on a limited set of users. The measurements have not been maintained and updated as uses of the web have evolved. Thus, even in the case of the most widely-studied application, there remains no contemporary model of HTTP workloads and no model that accounts for protocol improvements (e.g., the use of persistent connections in HTTP/v1.1) or newer uses of the web for peer-to-peer file sharing and remote email access.

A major limitation of current source-level modeling approaches is that they construct application-specific workload models. Given the complexity inherent in this approach (e.g., the effort involved in understanding, measuring, and modeling specific application-layer protocols), it is understandable that workload models usually consider only one or a small number of applications. However, few (if any) networks today carry traffic from only one or two applications or application classes. Most links carry traffic from hundreds or perhaps thousands of applications in proportions that vary widely from link to link.

This issue of application mixes is a serious concern for networking researchers. For example, in order to evaluate the amount of buffering required in a router under real conditions or the effect of a TCP protocol enhancement, one of the factors to be considered is the impact on/from the applications that consume the majority of bandwidth on the Internet today and that are projected to do so in the future. It would be natural to consider the performance implications of the scheme on web usage (e.g., the impact on throughput or request-response response times), on peer-to-peer applications, streaming media, other non-interactive applications such as mail and news, and on the ensemble of all applications mixed together. The majority of previous work in workload modeling has focused on the development of source-level models of single applications. Because of this, there are no models for mixes of networked applications. Worse, the use of analytic (distribution-based) models of specific TCP applications does not scale to developing workload models of application mixes comprised of hundreds of applications. Typically when constructing workload models, the only means of identifying application-specific traffic in a network is to classify connections by port numbers. For connections that use common reserved ports (e.g., port 80) one can, in theory, infer the application-level protocol in use (HTTP) and, with knowledge of the operation of the application level protocol, construct a source-level model of the workload generated by the application. However, one problem with this approach for HTTP is that a number of applications, such as simple object access protocol (SOAP), are essentially using port 80 as an access mechanism to penetrate firewalls and middleboxes.

A deeper problem with this approach is that a growing number of applications use port numbers that are not readily known, e.g., they have not been registered with the Internet Assigned Numbers Authority (IANA). Worse, many applications are configured to use port numbers assigned to other applications (allegedly) as a means of hiding their traffic from detection by network administrators or for passing through firewalls. For example, in a study of traffic received from two broadband Internet service providers by AT&T in 2003, the source (application) of 32-48% of the bytes could not be identified. Similarly, analyses of backbone traffic in Sprint and Internet2 networks did not identify the source of 25-40% of bytes, depending on the studied link. However, even if all connections observed on a network could be uniquely associated with an application, constructing workload models requires knowledge of the (sometimes proprietary or hidden) application-level protocol to deconstruct a connection and understand its behavior. This is a very time-consuming process, and doing it for hundreds of applications (or even the top twenty) in network traffic is a daunting task.

Conventional methods have been unable to construct statistically sound workload models from network packet traces that capture the richness in the mix of applications using a given link without requiring knowledge of the associated application-level protocols. Accordingly, there exists a need for methods, systems, and computer program products for modeling and simulating application-level traffic characteristics in a network based on transport and network layer header information, which is application-neutral.

SUMMARY

In one aspect of the subject matter disclosed, a method is disclosed for determining application-level traffic characteristics in a network based on transport and network layer header information. Transport and network layer header information is collected from packet traffic in a network. Packets are classified to different connections based on the transport and network layer header information. Each connection is modeled using an abstract syntax for characterizing bidirectional interactions between endpoints of each connection and delays between the interactions. Application-level characteristics of the packet traffic are determined based on the modeled connections.

In another aspect of the subject matter disclosed, a method is disclosed for generating simulated traffic that models application level traffic behavior in a real network. Transport and network layer header information is collected from packet traffic in a network. Packets are classified to different connections based on the transport and network layer header information. Each connection is modeled using an abstract syntax for characterizing bidirectional interactions between endpoints of each connection and delays between the interactions and recording a start time and an end time for each connection. Simulated traffic connections are generated based on the modeled connections.

In another aspect of the subject matter disclosed, a computer program product is disclosed that includes computer executable instructions embodied in a computer-readable medium for collecting transport and network layer header information from packet traffic in a network, classifying packets to different connections based on the transport and network layer header information, modeling each connection using an abstract syntax for characterizing bidirectional interactions between endpoints of each connection and delays between the interactions, and determining application-level characteristics of the packet traffic based on the modeled connections.

In another aspect of the subject matter disclosed, a computer program product is disclosed that includes computer executable instructions embodied in a computer-readable medium for collecting transport and network layer header information from packet traffic in a network, classifying packets to different connections based on the transport and network layer header information, modeling each connection using an abstract syntax for characterizing bidirectional interactions between endpoints of each connection and delays between the interactions and recording a start time and an end time for each connection, and generating simulated traffic connections based on the modeled connections.

In another aspect of the subject matter disclosed, a system is disclosed for determining application-level traffic characteristics in a network based on transport and network layer header information, the system includes logic configured to collect transport and network layer header information from packet traffic in a network and logic configured to classify packets to different connections based on the transport and network layer header information. The system also includes logic configured to model each connection using an abstract syntax for characterizing bidirectional interactions between endpoints of each connection and delays between the interactions and logic configured to determine application-level characteristics of the packet traffic based on the modeled connections.

In another aspect of the subject matter disclosed, a system is disclosed for generating simulated traffic that models application level traffic behavior in a real network. The system includes logic configured to collect transport and network layer header information from packet traffic in a network and logic configured to classify packets to different connections based on the transport and network layer header information. The system also includes logic configured to model each connection using an abstract syntax for characterizing bidirectional interactions between endpoints of each connection and delays between the interactions and recording a start time and an end time for each connection and logic configured to generate simulated traffic connections based on the modeled connections.

BRIEF DESCRIPTION OF THE DRAWINGS

Objects and advantages of the present invention will become apparent to those skilled in the art upon reading this description in conjunction with the accompanying drawings, in which like reference numerals have been used to designate like elements, and in which:

FIGS. 3A-3C are block diagrams illustrating three examples of common patterns of multiple ADU exchanges between TCP connection endpoints that may be modeled or simulated using the methods and systems described herein;

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Thus, the subject matter described herein can be embodied in many different forms, and all such forms are contemplated to be within the scope of what is claimed. Any such form of embodiment can be referred to herein as "logic configured to" perform a described action.

Figure 1:
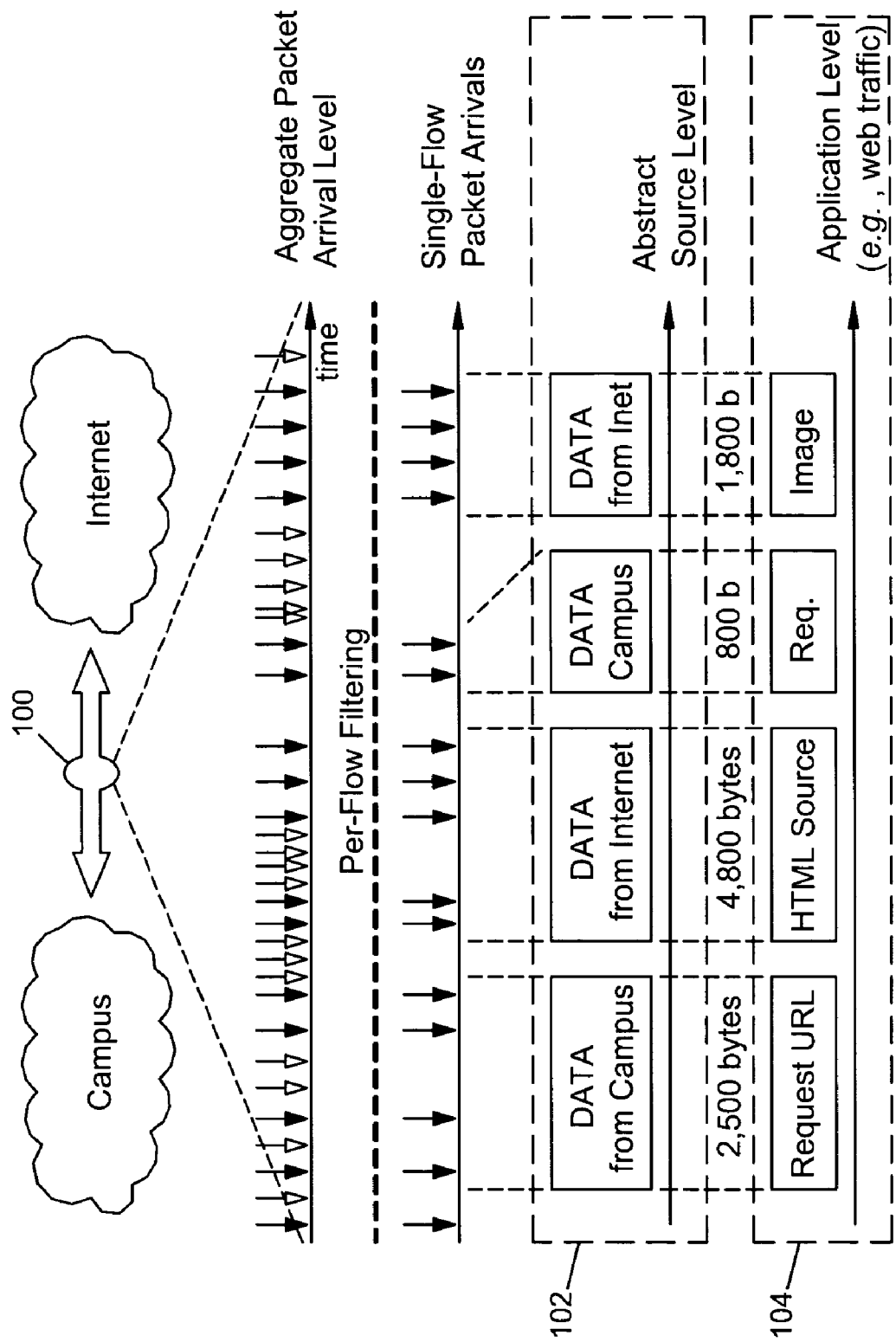
FIG. 1 is a block diagram illustrating network traffic seen at different levels of abstraction according to an aspect of the subject matter described herein.

Careful observation has shown that, from the perspective of the network, the vast majority of application level protocols are based on a few patterns of data exchanges within a logical connection between the endpoint processes. FIG. 1 is a block diagram illustrating network traffic seen at different levels of abstraction according to an aspect of the subject matter described herein. As illustrated by FIG. 1, the traffic on an Internet link monitored at a point in the link 100 can be seen as an aggregate of packets from many different connections. Each connection is driven by an application running at each of the two associated endpoints. For example, a web connection is used to transport requests for uniform resource locators (URLs) and web objects, such as hypertext markup language (HTML) source code and image files. For TCP applications, the arrivals of packets within a connection are a function of the source-behavior of the application and the congestion control and windowing mechanisms of the transport protocol. Each application has a different set of messages and objects that are exchanged between the two endpoints.

As illustrated in FIG. 1, however, there exists a level of abstraction, i.e., an abstract source-level 102, at which all connections are doing nothing more than sending data back and forth and waiting for application events. This abstract source-level 102 may be used for modeling traffic mixes in a manner that is suitable for generating closed-loop traffic. According to an important aspect of the subject matter described herein, the data exchanges that occur in abstract source level (or can be modeled through analysis of network and transport layer header information and without knowledge of the applications). Methods for characterizing source-level behavior in a network through analysis of packet traces will be described in detail below. Because application behavior can be characterized without knowledge of the applications themselves, traffic modeling and simulation can be simplified over conventional modeling or simulation methods that require simulation of application protocols. In FIG. 1, the two endpoint processes exchange data in units defined by their specific application-level protocol 104. The sizes of these application-data units (ADUs) depend only on the application protocol and the data objects used in the application and, therefore, are largely independent of the sizes of the network-dependent data units employed at the transport level and below. For example, the sizes of HTTP requests and responses depend on the sizes of headers defined by the HTTP protocol and the sizes of files referenced but not on the sizes of TCP segments used at the transport layer.

Figure 2:
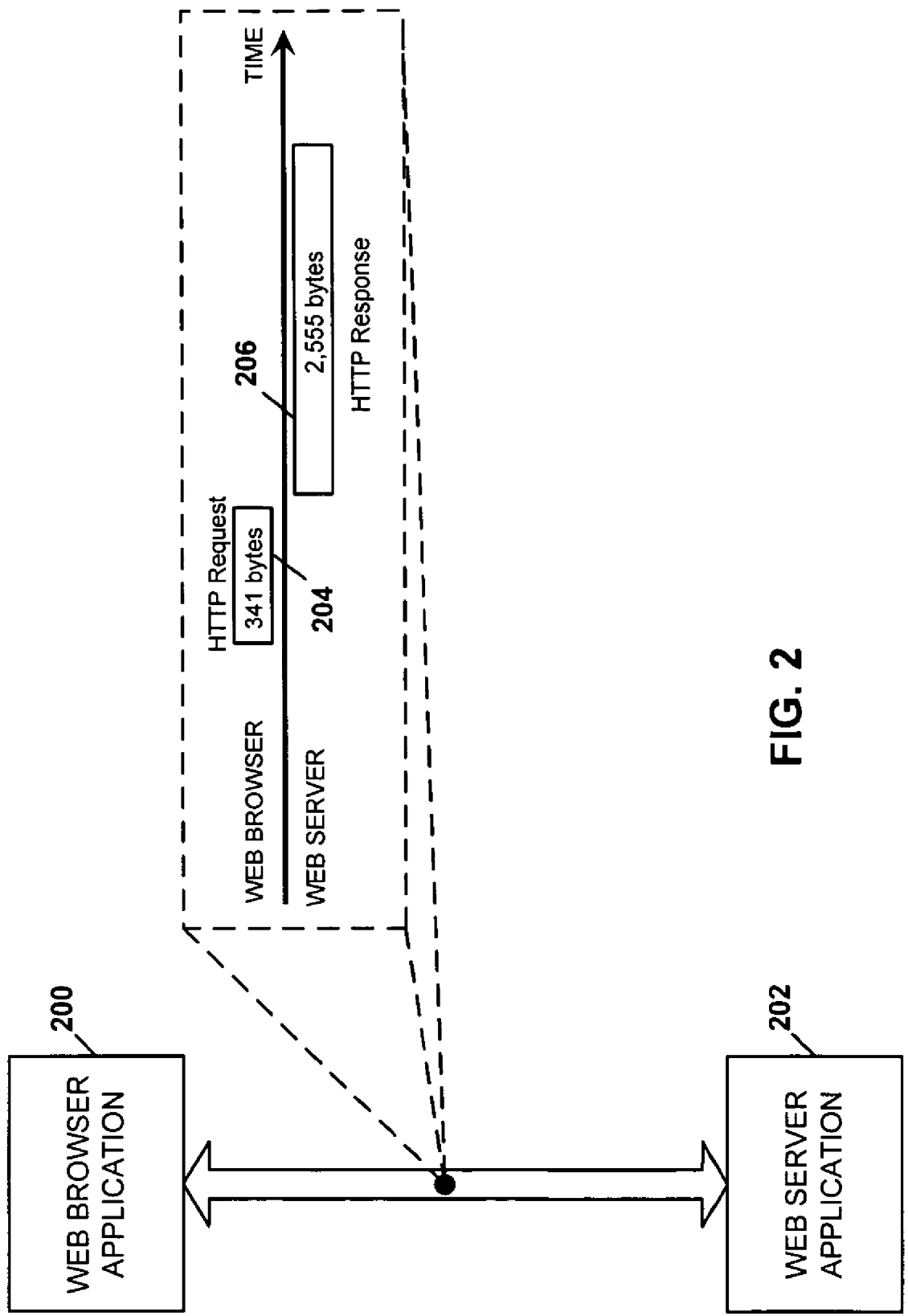
FIG. 2 is a block diagram illustrating a pattern of application data unit (ADU) exchange over time in an HTTP connection between a web browser and a web server that may be modeled or simulated using the methods and systems described herein.

One common ADU exchange pattern used by TCP applications arises from the client-server model of application structure, such as in the case of a web server and browser, and includes a single ADU exchange. FIG. 2 is a block diagram illustrating a pattern of ADU exchange over time in an HTTP connection between a web browser 200 and a web server 202 that may be modeled or simulated using the methods and systems described herein. In FIG. 2, web browser 200 sends an HTTP Request 204 to web server 202, which sends a Response 206 with the requested object(s). In this example, Request 204 includes 341 bytes due to the HTTP header and the length of the file name for the file being requested. HTTP Response 206 includes 2555 bytes, which includes the HTTP header and the file being requested. The time interval between Request 204 and Response 206 depends on network or end-system properties that are not directly related to or under the control of the application.

FIGS. 3A-3C are block diagrams illustrating three examples of common patterns of multiple ADU exchanges between TCP connection endpoints that may be modeled or simulated using the methods and systems described herein. In FIG. 3A, a persistent HTTP connection is illustrated in which three web requests are sent from a browser to a web server and three corresponding web responses (objects) are sent from the server to the browser (for a total of six ADUs exchanged). The first two request/response exchanges correspond to a first document download (Document 1), such as a web page, while the last exchange corresponds to a second document download (Document 2). Two "quiet times" 300 and 302 are also shown, during which no transmissions are taking place in either direction of the connection. Quiet time 300 is relatively short (120 ms), while quiet time 302, which is between the two documents, is much longer (3.12 s), indicating it was probably due to user think time rather than network conditions.

In FIG. 3B, a sample sequence of ADUs exchanged by two simple mail transfer protocol (SMTP) servers over an SMTP connection is shown. In this case, most data units are small and correspond to application-level control messages (e.g., the host info message, the initial HELO message, etc.) rather than application objects (e.g., the actual email message of 22,568 bytes).

FIG. 3C shows a sample sequence of ADUs exchanged when a network news transfer protocol (NNTP) reader checks the status of a number of newsgroups over an NNTP connection. After a quiet time of 5.02 seconds, the NNTP reader requests the content of one article (Article n) and receives the article containing 1056 bytes.

According to an aspect of the subject matter described herein, the ADU exchange pattern can be modeled as one or more "epochs", where each epoch consists of either 0 or 1 ADU from each endpoint followed by an inter-epoch time interval (or the end of the logical connection). Thus, a TCP application can be modeled as generating a number of time-separated epochs, where each epoch is characterized by ADU sizes and an inter-epoch time interval. More particularly, the source-level behavior, in which each TCP connection is represented by a connection vector $C_i=(e_1, e_2, \ldots, e_n)$, can be modeled with n epochs e. Each epoch is a triplet of the form $e_j=(a_j, b_j, t_j)$ that describes the data $(a_j, b_j)$ and quiet time $(t_j)$ parameters of the j'th exchange in a connection. Each $a_j$ captures the amount of data sent from the initiator of the connection (e.g., a web browser) to the connection acceptor (e.g., a web server), and each $b_j$ represents data flowing in the other direction. Using this model, the connection shown in FIG. 2 can be described as <(341, 2555, Ø)>, where the first ADU 204, $a_1$, has a size of 341 bytes, and the second ADU 206, $b_1$, has a size of 2,555 bytes, and Ø represents the end of the logical connection. Similarly, the SMTP connection in FIG. 3B can be represented as <(0, 93, 0), (32, 191, 0), (77, 59, 0), (75, 38, 0), (6, 50, 0), (22568, 44, Ø)>. As this last connection vector shows, application protocols sometimes have a single ADU in an epoch (e.g., $a_1=0$ for SMTP and $b_1=0$ for FTP data). This model, referred to hereinafter as the "a-b-t" model of a connection, captures three essential source-level properties of a TCP connection: data in the "a-direction", data in the "b-direction" and quiet times "t" between data units.

Figure 4:
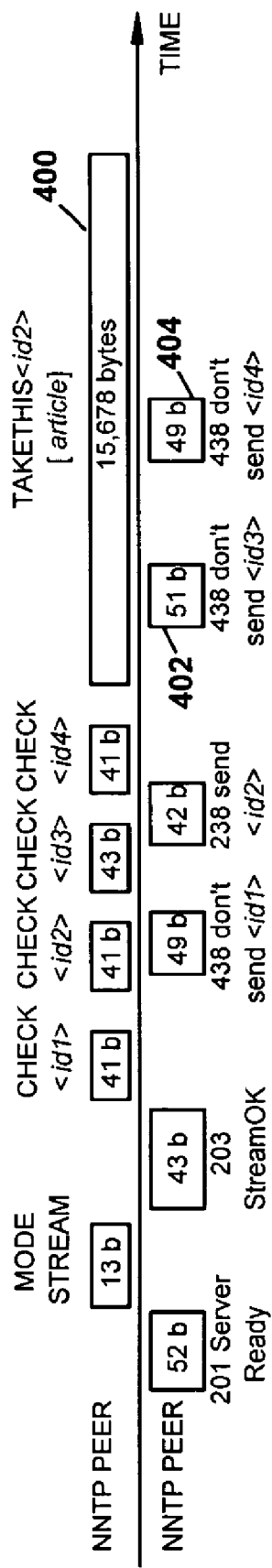
FIG. 4 is a block diagram illustrating a pattern of ADU exchanges that overlap in time (i.e., are concurrent) between two endpoints of a connection that may be modeled or simulated using the methods and systems described herein.

One problem with identifying ADU sizes based on network and transport layer information occurs when ADUs between endpoints of a connection overlap in time. When data packets from each connection endpoint overlap in time, it may be difficult to determine when an ADU from one endpoint is complete. FIG. 4 is a block diagram illustrating a pattern of ADU exchanges that overlap in time (i.e., are concurrent) between two endpoints of a connection according to another aspect of the subject matter described herein. In FIG. 4, an NNTP connection is shown between two NNTP peer servers in which NNTP's streaming mode is used. An article 400 is the last data unit on the initiator side (with a size of 15,678 bytes) and coincides with two data units 402 and 404 that were sent from the acceptor side (two "438 don't send" messages). Therefore this connection is said to exhibit data exchange concurrency. In contrast, the connections illustrated in FIGS. 2 and 3A-3C illustrate exchanging data units in a sequential fashion.

A fundamental difference between concurrent and sequential communication exchanges is that sequential exchanges (e.g., request/response) always take a minimum of one round-trip time. Although data exchange concurrency is much less common than sequential communication exchanges, application designers make use of data concurrency for two primary purposes. The first is to maximize the use of bandwidth and time associated with the connection, i.e., keep the pipe full, by making use of requests that overlap with uncompleted responses. This avoids the one round-trip time per epoch cost associated with a sequential request/response exchange, so the connection can be fully utilized. Examples of protocols that attempt to keep the pipe full are the pipelining mode in HTTP, the streaming mode in NNTP, and the BitTorrent and Rsync protocols. The second purpose is supporting natural concurrency, in the sense that some applications do not need to follow the traditional request/response paradigm. Examples of protocols/applications that support concurrency are instant messaging and Gnutella (in which the search messages are simply forwarded to other peers without any response message).

Figure 5:
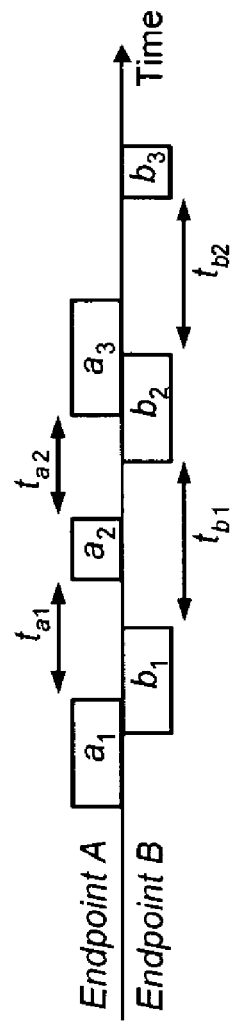
FIG. 5 is a block diagram illustrating data-concurrent connection parameters that can be used for modeling network traffic according to an aspect of the subject matter disclosed herein.

According to an aspect of the subject matter described herein, data-concurrent connections may be modeled by considering each direction of the connection independently. FIG. 5 is a block diagram illustrating parameters that can be used for modeling data-concurrent connections according to an aspect of the subject matter disclosed herein. In FIG. 5, the blocks and time periods above the time line represent data being sent by endpoint A to endpoint B, and the blocks and time periods below the timeline represent data being sent from endpoint B to endpoint A. It can be seen from FIG. 5 that $a_1$ overlaps with $b_1$ and $a_3$ overlaps with $b_2$.

Using a modeling method according to an aspect of the subject matter described herein, each direction of the connection can be modeled independently by a respective connection vector of the form $<(a_1, t_{a1}), (a_2, t_{a2}), \ldots, (a_n, t_{an})>$ for packets leaving endpoint A and $<(b_1, t_{b1}), (b_2, t_{b2}), \ldots, (b_n, t_{bn})>$ for packets leaving endpoint B, where $a_j$ and $b_j$ represent the size of the j'th ADU for each respective direction, and $t_{aj}$ and $t_{bj}$ represent the time between respective ADUs. Using two independent vectors provides enough detail to capture the two purposes of the data-concurrency described above, since in the first case, one side of the connection completely dominates (so only one of the connection vectors matters), and in the second case, the two sides are completely independent.

Figure 6:
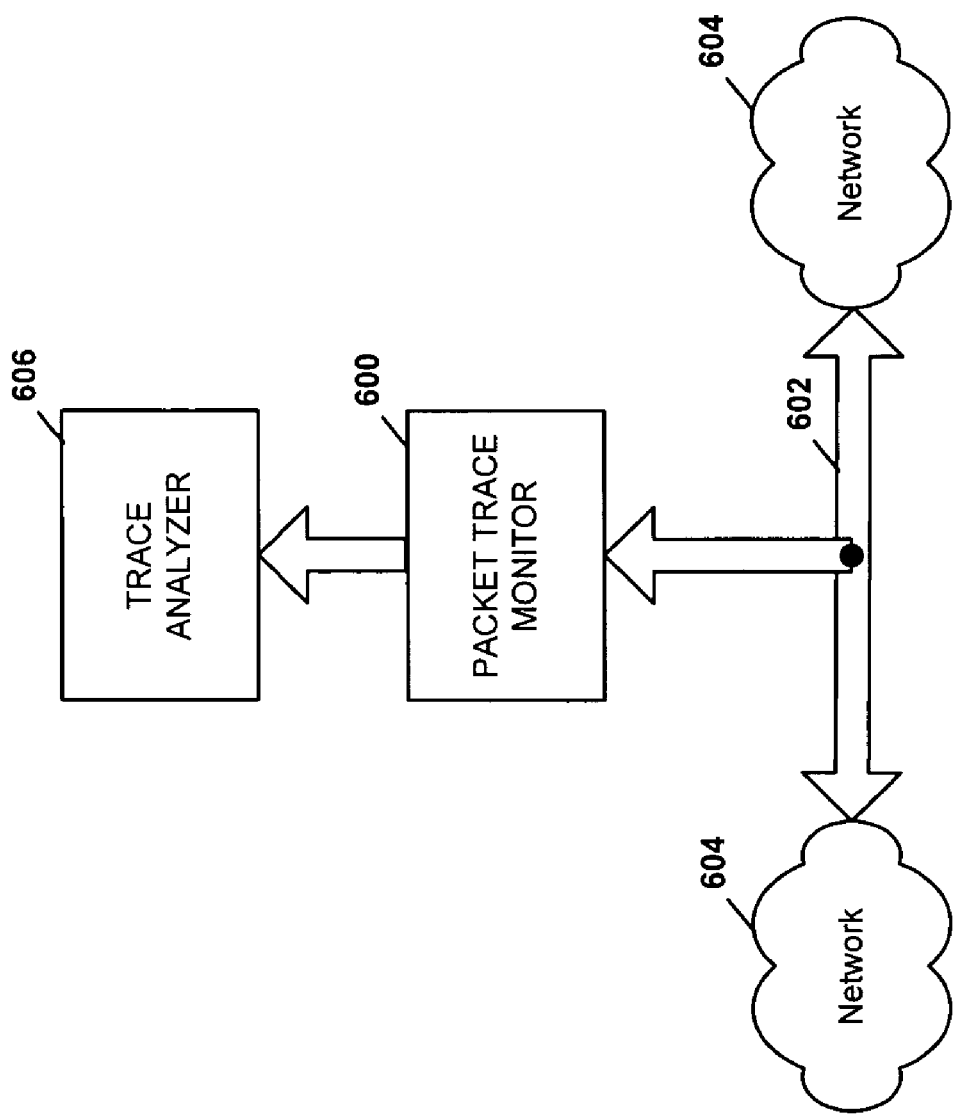
FIG. 6 is a block diagram illustrating the system for monitoring packet traffic on a link according to an aspect of the subject matter disclosed herein.

Modeling TCP connections as a pattern of ADU transmissions provides a unified view of Internet information exchanges that does not require knowledge of the specific applications driving each TCP connection. The first step in the modeling process is to acquire empirical data and process that data to produce an a-b-t model. FIG. 6 is a block diagram illustrating a system for monitoring packet traffic on a link according to an aspect of the subject matter disclosed herein. In FIG. 6, a packet trace monitor 600 collects "packet traces" that provide IP source and destination information as well as TCP header information from a link 602 associated with one or more networks 604. For example, packet trace monitor 600 may be a processor-based system running computer-executable code to perform passive tracing of TCP/IP packet headers. An example of packet trace code suitable for collecting TCP/IP packet headers includes tcpdump, which is accessible by a command on most Unix-based operating systems. Packet trace monitor 600 performs packet trace data acquisition for capturing unidirectional and/or bidirectional traces. For each packet monitored, an IP source address and an IP destination address is determined, TCP sequence and port information is determined, and a timestamp indicating the relative point in time that the packet was monitored is associated with the packet. Packet trace analyzer 606 analyzes the data and generates the a-b-t models described above for each connection. Although packet trace monitor 600 and trace analyzer 606 are shown as logically separate functions, but it should be appreciated that they may be performed by the same processor-based system running computer-executable code.

Figure 7:
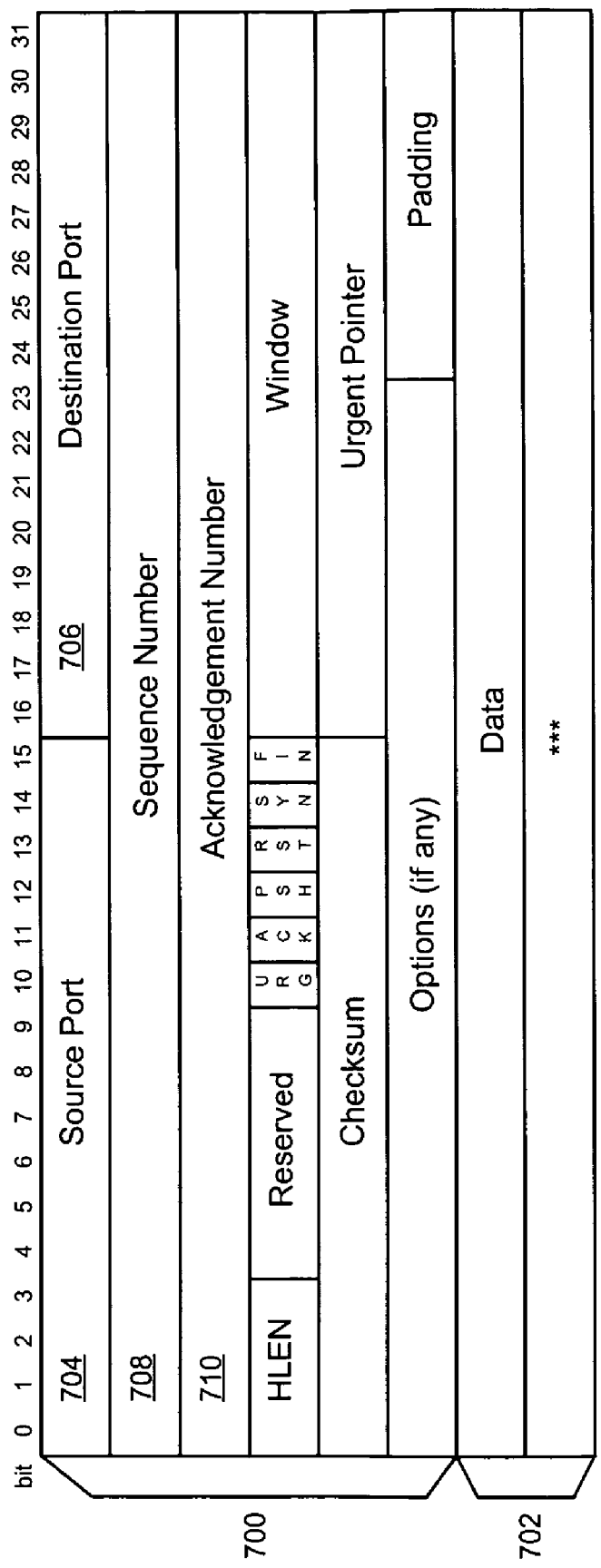
FIG. 7 is a schematic diagram illustrating a conventional TCP segment.

In order to generate the a-b-t traces, trace analyzer preferably analyzes TCP sequence numbers. As a preliminary step, trace analyzer 606 may identify packets associated with the same connection using a combination of source IP address destination IP address, source TCP port, and destination PCT port. TCP connection establishment and connection terminating exchanges may be used to identify the start and end of each connection. Once the packets associated with each connection have been identified, data sequence numbers acknowledgement sequence numbers and time stamps may be used to identify ADUs and time periods between ADUs. FIG. 7 is a schematic diagram illustrating a TCP packet (segment). In FIG. 7, TCP header 700 and data 702 together comprise a TCP packet. TCP header 700 includes a 16-bit source port 704 identifying the port used by the source of the packet, a 16-bit destination port 706 identifying the port to which the packet is destined, a 32-bit sequence number 708 identifying the current position of the first data bytes in the packet within the entire byte stream for the TCP connection (after reaching $2^{32}-1$, this number will wrap around to 0), a 32 bit acknowledgment number 710 identifying the next data byte the sender expects from the receiver (one greater than the most recently received data byte), and additional bits, such as control bits, header length, window size, and others.

Figure 8:
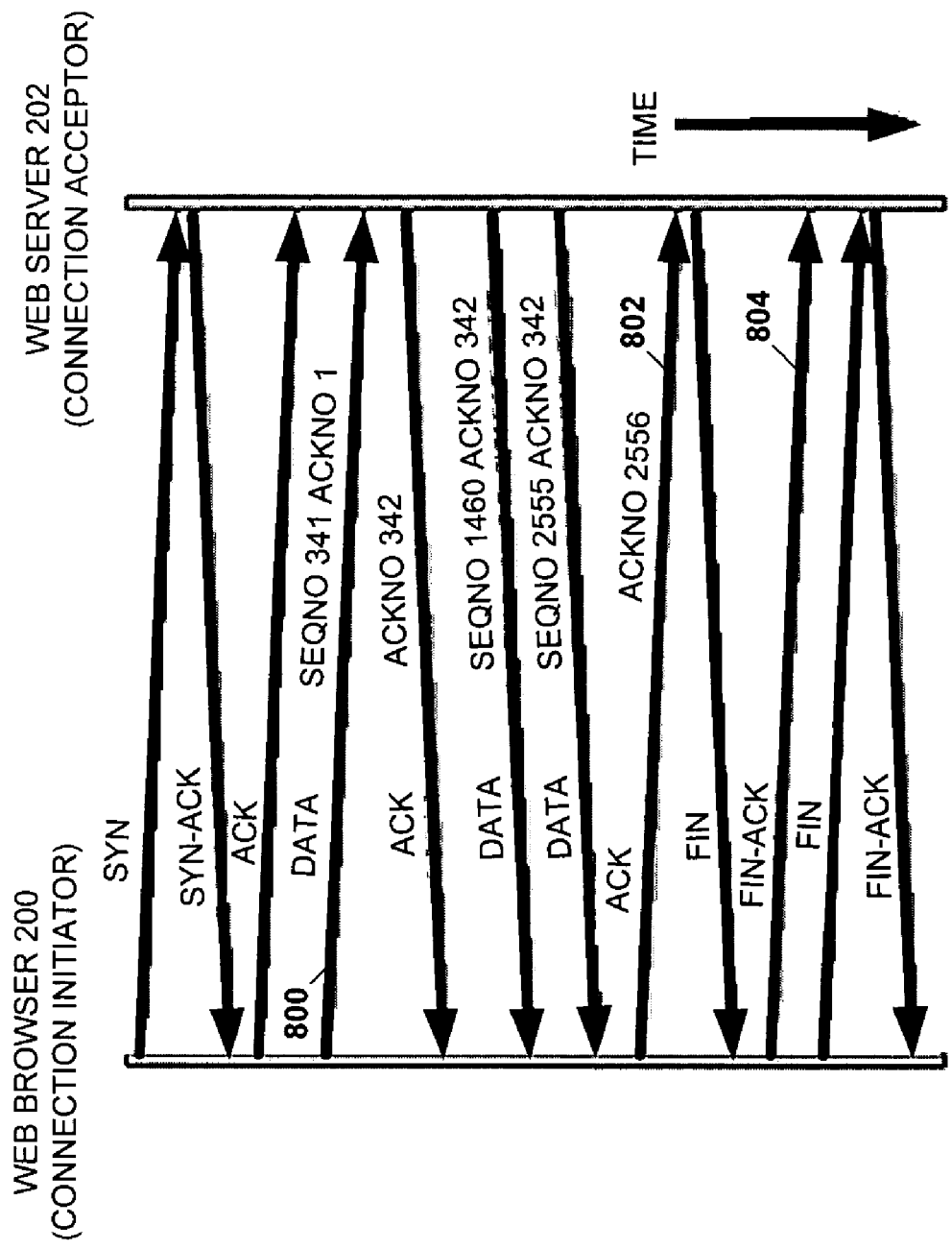
FIG. 8 is a signaling diagram illustrating the source level ADU exchange of FIG. 2 at the TCP level.

FIG. 8 is a signaling diagram illustrating the source level ADU exchange of FIG. 2 at the TCP level. The TCP level exchange illustrated in FIG. 8 may be used to generate the source level exchange of FIG. 2 using the methods and systems described herein. The sequence numbers (seqno) in each packet provide enough information to compute ADU sizes. In FIG. 8, web browser 200 establishes a connection with the web server 202 through the exchange of the SYN, ACK, and SYN-ACK messages. Trace analyzer 606 may utilize the SYN, ACK, SYN-ACK exchange to identify the start of the ADU exchange. Once the connection is established, a first data packet is sent from web browser 200 with a sequence number of 341, representing sequence number of the last data byte in the segment. In response to this data packet, an acknowledgment packet with acknowledgment number (ackno) 342 is sent from the web server 202, followed by two data packets (with the same acknowledgment number). The acknowledgment number represents the highest sequence number received by web server 202 plus one. Because web server 202 has received a data packet with 341 bytes of data and a sequence number of 341, the acknowledgment number of 342 is sent to web browser 200 to inform web browser 200 that all 341 bytes were received. When web server 202 sends the two data packets to web browser 200, the sequence numbers in the data packets are set to 1460 and 2555, respectively, representing the data byte with the highest sequence number in each packet. Following the two data packets, web browser 200 sends an ACK to web server 202 with an acknowledgement number of 2556 indicating that all 2555 bytes of the file transmitted from web server 202 were received. In the last four lines of the message flow diagram, and the TCP connection is closed through the exchange of FIN and FIN-ACK messages. Trace analyzer 606 may utilize the connection close procedure to identify the end of the connection.

According to one aspect of the subject matter described herein, sequence numbers and acknowledgment numbers can be used to determine ADU sizes as well as a change in the directionality of data transmission. In FIG. 8, for example, the boundary between the first data unit $a_1$, which was transported using a single packet and had a size of 341 bytes, and the second data unit $b_1$, which was transported using two packets and had a size of 2,555 bytes, can be detected by analyzing when sequence numbers stop increasing in one direction and start increasing in the opposite direction.

More particularly, headers for TCP segments flowing in one direction of a connection may be monitored by packet trace monitor 600. When unidirectional traces are captured, changes in sequence numbers in TCP segments are used to compute ADU sizes flowing in the direction traced and changes in ACK values are used to infer ADU sizes flowing in the opposite (not traced) direction. Unidirectional trace capture works best with sequential and alternating ADU exchanges (one in each direction per exchange) as found in FIGS. 2 and 3A-3C. In such a case, there is an alternating pattern of advances in the ACK sequence number values followed by advances in the data sequence number values (or vice versa). Consequently, the beginning and ending TCP segments of an ADU and the boundary between exchanges may be determined. Stated differently, an advance in the data sequence numbers marks the end of an ADU flowing in the direction opposite to the traced direction and an advance in the ACK sequence number marks the end of an ADU flowing in the direction of the trace. Other events such as FIN or Reset can also mark ADU boundaries. Timestamps indicating when the segments were monitored by the packet trace monitor may be used to mark the beginning or end of an ADU and to compute the inter-epoch times, and timestamps on the SYN segments may be used to compute connection inter-arrival times. Accordingly, TCP headers of packets traveling in only one direction may be analyzed to determine the bidirectional traffic on the link according to an aspect of the subject matter disclosed herein.

In FIG. 8, for example, ADU sizes exchanged in both directions between web browser 200 and web server 202 may be determined based on analyzing sequence numbers and/or acknowledgement numbers in TCP packet headers transmitted in one direction from web browser 200 to web server 202

(or vice versa). For example, web browser 200 transmits messages 800 (seqno 341, ackno 1) and 802 (ackno 2556) in the direction of web server 202. Analysis reveals that message 800 includes an acknowledgement number of 1, indicating no application data has been previously sent in the opposite direction. Further analysis reveals that message 800 includes 341 bytes of application data, as indicated by sequence number 341. The next transmission from web browser 200 to web server 202 is ACK message 802 with an acknowledgement number of 2556, indicating that 2,555 (2,556−1) bytes were transmitted from web server 202 to web browser 200. The FIN-ACK message 804 indicates that no further application data is to be sent for this connection.

Applying the foregoing analysis to a trace of the TCP/IP headers from the connection illustrated in FIG. 3A, an a-b-t connection vector, $C_i$=<(329, 403, 0.12), (403, 25821, 3.12), and (356, 1198, Ø)> with a start time, $T_i$, is produced. The connection vector $C_i$ consists of three epochs corresponding to the three HTTP request/response exchanges. This vector represents a web browser and a web server using a TCP connection the browser initiated at $T_i$ as a persistent HTTP connection where the browser sends three HTTP requests of 329, 403, and 365 bytes, respectively, and the server responds to each of them with HTTP responses (including object content) of 403, 25821, and 1198 bytes, respectively. The second request was sent by the browser 120 milliseconds after the last segment of the first response was received and the third request was sent 3120 milliseconds after the second response was received. There were 29 TCP segments (including SYNs and FINs) in the original packet header trace but their sizes and timing are network-dependent and the analysis has produced a summary representation in this connection vector that models the source-level (browser and server) behaviors.

The logical data ordering described above can create accurate models for data traffic. The accuracy of the network traffic model can be improved, however, by monitoring data in both directions in order to better consider data-concurrent connections, such as the one shown in FIG. 4. For example, the packet that carried the last b-type data unit may have been sent roughly at the same time as another packet carrying some of the data of the a-type data unit sent from the other side. Sequence numbers will show that these two packets do not acknowledge each other, so it cannot be determined whether the data in one of them was supposed to logically come before the data in the other packet. Accordingly, both directions of a link may be monitored separately to produce connection vectors as described above with reference to FIG. 5. This approach results in more accurate network traffic modeling that includes the less-common data-concurrent connections according to another aspect of the subject matter disclosed herein.

Moreover, the observation that sequence numbers of two packets do not acknowledge each other makes it possible to detect data concurrency. According to another aspect of the subject matter disclosed herein, a method for detecting data concurrency in a connection is disclosed herein. A connection is considered to be concurrent when there exists at least one pair of non-empty TCP packets p and q such that p is sent from the initiator to the acceptor, q is sent from the acceptor to the initiator, and the two inequalities $p_{seqno} > q_{ackno}$ and $q_{seqno} > p_{ackno}$ are satisfied. If the conversation between the initiator and the acceptor is sequential, then for every pair of segments p and q, either p was sent after q reached the initiator, in which case $q_{seqno} = p_{ackno}$, or q was sent after p reached the acceptor, in which case $p_{seqno} = q_{ackno}$. Thus, every non-concurrent connection can be classified based on the associated sequence numbers and acknowledgment numbers. Using this methodology, concurrent exchanges of data are detected, not just concurrent exchanges of packets in which a data packet and an acknowledgment packet are sent concurrently. In the latter case, the logical ordering of data inside the connection is never broken. Similarly, the simultaneous close mechanism in TCP (in which two FIN packets are sent concurrently) is not considered to be data concurrency.

Figure 9:
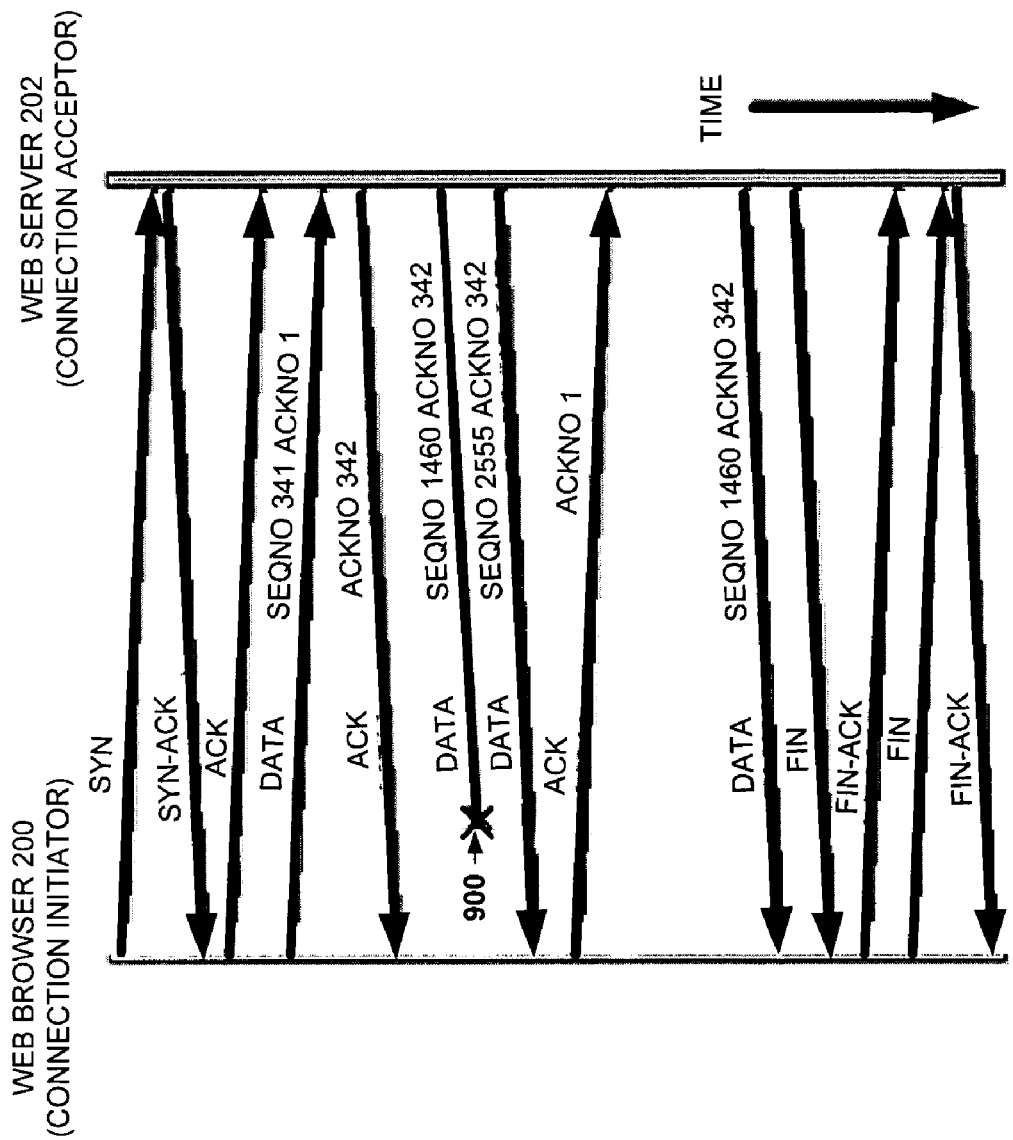
FIG. 9 is a signaling diagram illustrating another example of the source level ADU exchange at the TCP level.

The methods and systems described herein may be utilized to derive source level behavior from TCP level exchanges, even when packets are lost and retransmitted at the TCP level. FIG. 9 is a signaling diagram illustrating a TCP level exchange in which a packet is lost and retransmitted. In FIG. 9, the first data packet 900 of the ADU sent from the web server 202 is lost somewhere in the network. Web server 202 learns that the data packet with data sequence number 1460 was lost when web server 202 receives the acknowledgement message from web browser 200 with an acknowledgement number of 1, rather than 2556. Once this acknowledgment message is received, web server retransmits the 1460-byte data packet. Depending on where in the transmission path the analysis is performed (before or after the point of loss), the analyzed TCP packet header trace may or may not include the first instance of the packet with end sequence number 1460. If this packet is present in the trace, the analysis will reveal that the third data packet from a web server 202 is a retransmission, so it should be ignored and the size of the data should be 2,555 bytes. If the lost packet is not present in the trace, the analysis will reveal the reordering of packets using their sequence number and a size for $b_1$ of 2,555 bytes.

According to another aspect of the subject matter described herein, a packet trace monitor 600 can measure ADU sizes in the presence of arbitrary packet reordering and loss on a connection. For sequential connections, the starting point is the observation that, despite the possibility of loss and reordering, data in a TCP connection has a unique logical ordering (otherwise, the connection would not be transmitting useful data). For example, the data in the retransmitted segment in FIG. 9 logically precedes the data in the previous data packet, since the sequence number of the retransmitted packet is lower. Accordingly, packet trace monitor 600 can monitor packets in arrival order and insert a summary of each packet into a data structure that captures the logical data ordering in a TCP connection and also uses the timestamps to compute the inter-epoch quiet times. The timestamp of the SYN packet may be used to compute the connection start time, $T_i$, relative to the beginning of the trace. In practice, however, the starting sequence numbers of a TCP connection are randomized, so the sequence numbers of both the SYN and FIN packets are preferably used to determine the boundaries of the connection. Furthermore, packet trace monitor 600 preferably detects sequence number wrap-arounds, since TCP sequence numbers are represented using only 32-bits.

Figure 10:
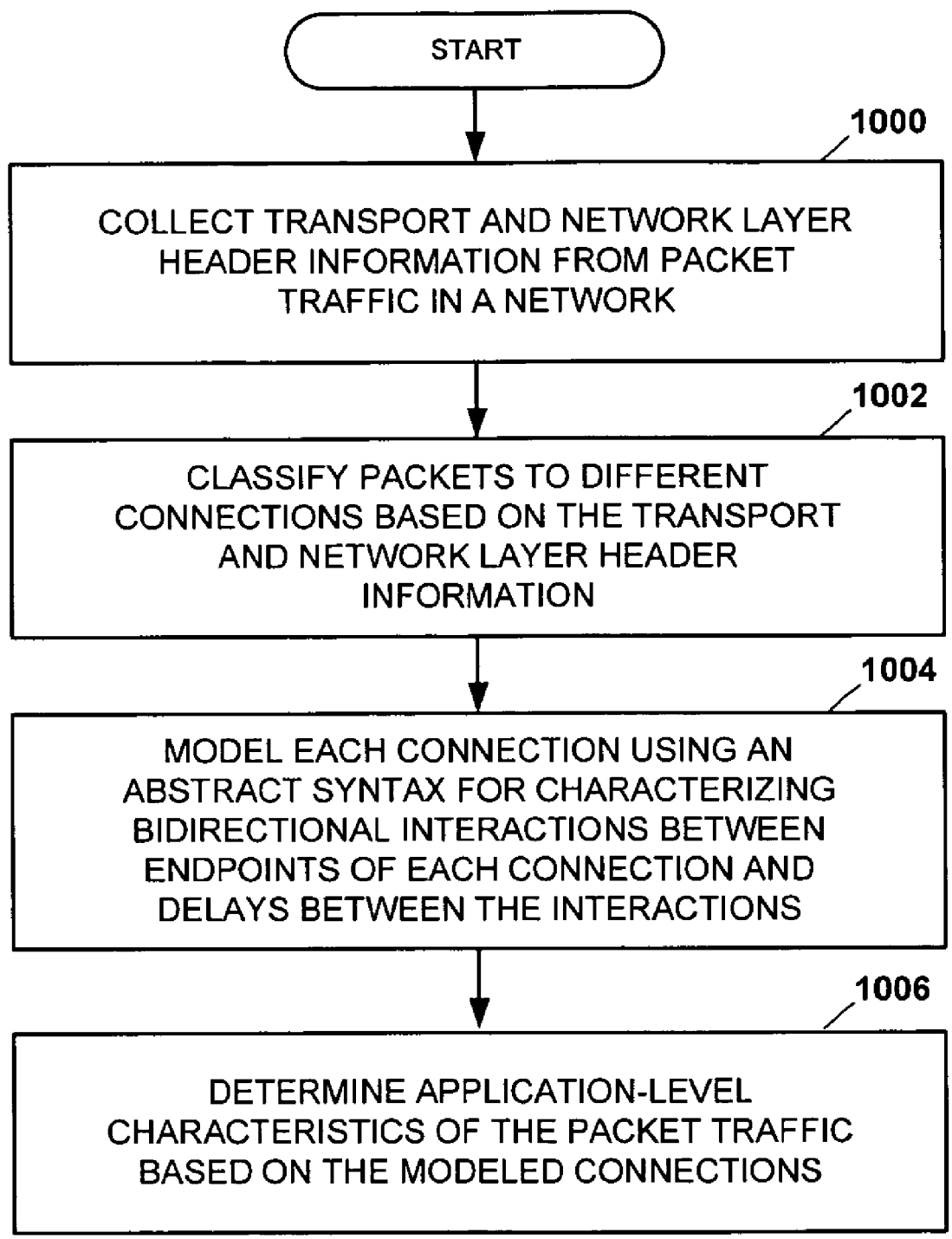
FIG. 10 is a flow diagram illustrating a method for determining application-level traffic characteristics in a network based on transport and network layer header information according to an aspect of the subject matter described herein.

FIG. 10 is a flow diagram illustrating a method for determining application-level traffic characteristics in a network based on transport e.g., TCP header information, and network layer header information, e.g., IP addresses. In FIG. 10, transport and network layer header information is collected from packet traffic in a network in step 1000. Packets are classified to different connections based on the transport and network layer header information in step 1002. For example, packets having the same source IP address, destination IP address, source TCP port, and destination TCP port and that are within the same connection establishment and termination sequences can be classified together. In addition, a timestamp indicating when the packets were monitored is considered in classifying the packets to a connection and ordering the packets in time. In step 1004, each connection is modeled using an abstract syntax, such as the a-b-t model described above, for characterizing bidirectional interactions between endpoints of each connection and delays between the interactions. Application-level characteristics of the packet traffic are determined in step 1006 based on the modeled connections.

The a-b-t model provides a framework for the systematic identification and study of application-level communication patterns in Internet traffic. Statistical clustering techniques may be applied to determine application-level characteristics of the packet traffic. For example, connections can be grouped into traffic classes that represent similar communication patterns. A clustering scheme may be employed to divide a given set of connection vectors having similar features into groups known as clusters. Each connection vector is summarized using a vector of statistical features called a feature vector. Each feature can capture some relevant characteristics of the sequence, such as the number of exchanges, the total number of bytes sent by the initiator, the homogeneity in the sizes of the data units, and the like. The similarity between two connection vectors may then be measured by the similarity between their associated feature vectors. More particularly, the clustering of source-level communication patterns begins by extracting from each connection vector a number of numerical features that are designed to capture important aspects of the two-way data transfer it describes. Some features that may be collected for each connection vector include the number of epochs, the number of bytes sent by each of the connection endpoints, the size of the largest and/or smallest epoch in each direction, as well as the mean and standard deviation of the set of epochs in each direction. Once these and other features are analyzed, feature vectors can be associated with the connection vectors, which may then be grouped according to their features to perform application-level analysis. That is, application-level characteristics of each group can be determined.

For example, with reference again to FIGS. 3A-3C, feature vectors can be computed for each illustrated connection. A feature vector $F=(a, b, c, d, e)$ that includes values for the number of epochs (a), the number of bytes sent by each of the connection endpoints (b,c), the size of the largest ADU (d), and the size of the smallest ADU (e), in that order, may be computed for each of the connections illustrated in FIGS. 3A-3C. The resulting feature vectors $F_{3A}$, $F_{3B}$, and $F_{3C}$ for the connections illustrated in FIGS. 3A, 3B, and 3C, respectively, are shown below:

$F_{3A}=(3, 1088, 27422, 25821, 329)$
$F_{3B}=(6, 22768, 475, 22568, 6)$
$F_{3C}=(6, 74, 201, 1058, 12)$

The similarity between two connection vectors can be determined by measuring a Euclidean or correlation-type distance between their feature vectors. Once the distance between each pair of connection vectors has been determined, connection vectors can be grouped using a clustering algorithm. In the current example, the similarities between feature vectors $F_{3A}$, $F_{3C}$, and $F_{3C}$ will be shown to be limited based on the distance between the vectors. This follows from the fact that each vector is representative of features from a different application. If, however, a feature vector is computed for a second HTTP connection, it will be more similar (i.e., closer in distance) to feature vector $F_{3A}$ than feature vectors $F_{3C}$ and $F_{3C}$. Accordingly, the second HTTP connection would be more likely to be grouped with the connection illustrated in FIG. 3A.

Formally, a clustering scheme is a procedure that divides a given set of feature vectors $x_1, x_2, \ldots, x_m \epsilon R$ into k disjoint groups $S_1, S_2, \ldots, S_k$, which are known as clusters. The goal of clustering is to find a small number k of clusters such that feature vectors within the same clusters are close together, while vectors in different clusters are far apart. Once an application-level connection vector is determined from a transport connection, the connection vector is summarized using a feature vector. The similarity between two connection vectors can then be determined by the similarity between their associated feature vectors. Two alternative distance measures may be considered here, the standard Euclidean distance, as shown in Equation 1 below:

$$d_{ij} = \sqrt{\sum_{k=1}^{m} (x_{ik} - x_{jk})^2}, \quad (1)$$

and the Pearson correlation coefficient. Once the distance between each pair of connection vectors is defined, these vectors can be grouped using any number of standard clustering algorithms, and can employ agglomerative and divisive hierarchical methods.

As a first step in clustering source level communication patterns a number of numerical features that are designed to capture important aspects of the two-way data transfer it describes can be extracted from each connection vector. Let $v=(c_1, \ldots, c_n)$ be a given connection vector whose j'th epoch is given by the triplet $c_j=(a_j, b_j, t_j)$, as described above. The most critical features of v are the number of epochs, denoted by e, and the total number of bytes sent by each of the connection hosts, $$a_{tot} = \sum \frac{n}{j} = 1 \; a_j \text{ and } b_{tot} = \sum \frac{n}{j} = 1 \; b_j.$$

Let $A=\{a_1, \ldots, a_n\}$ be the collection of a-type data units measured during the connection. Other useful features include $a_{max}=\max\{a_j \epsilon A\}$ and $a_{min}=\min\{a_j \epsilon A\}$, the mean $a_\mu$ and standard deviation $a\sigma$ of A; and the first, second and third quartiles of A, denoted by $a_{1q}$, $a_{2q}$, and $a_{3q}$ respectively. In order to better capture the sequential structure of the a-type data units, we measure the total variation $$a_{vs} = \sum \frac{n}{j} = 2 \; a_j - a_{j-1},$$

maximum first difference $a_{fd}=\max_j a_j$, lag-1 autocorrelation $a_p$, and homogeneity $a_h=(a_{max}+1)/(a_{min}=1)$ of $a_1, \ldots, a_n$ in cases where $n \geq 2$. Analogous features can be extracted from the collection $B=\{b_1, \ldots, b_n\}$ of b-type data units. As inter-epoch times will reflect network, as well as application-level behavior, additional attention may be paid to $t_{max}$, $t_{2q}$, and $t_{tot}$.

To assess the relationship between the a- and b-type data units, v directionality $dir=\log (a_{tot}/b_{tot})$ and the lag 0 and 1 cross-correlations between B and A, denoted $p_1$ and $p_2$ respectively, can be measured. Rank correlations typically exhibit a more diverse and meaningful spectrum of values across different connections. Thus correlation measurements may be based on a Spearman's rank correlation coefficient, rather than the more common Pearson coefficient.

Regarding scale, while correlations will range between -1 and +1, features such as e and $a_{tot}$ can range anywhere from one to several million. To address this disparity, one can take logarithms of those features that vary over several orders of magnitude. Each feature is then translated and scaled so that, for the vast majority (e.g., more than 96%) of measured connections, its value is between 0 and 1. In exceptional cases, e.g., a connection with $10^7$ epochs, features greater than 1 or less than 0 can be allowed. Allowing features to take values outside the unit interval avoids the possible compression of their dynamic range by a small fraction of outliers.

Once normalized, each feature plays a role in determining the Euclidean distance between two feature vectors. The contributions of different features can be weighed differently. Some features (e.g., correlations and total variation) are not well-defined or not meaningful for connection vectors with fewer than three epochs. In this case, only the Euclidean distance (or correlation) between those features that are defined in both associated vectors can be used and then normalize by the number of such "active" features, so that the resulting distance can be compared to distances between longer connections. Table 1 below lists some features that may be used in feature vectors as well as calculations that they be applied to eighteen clustering analysis.

TABLE 1

| Feature | | | Description |
|---|---|---|---|
| | n | | Number of epochs |
| $a_{tot}$ | $b_{tot}$ | | Total bytes |
| $a_{max}$ | $b_{max}$ | $t_{max}$ | Maximum bytes or seconds |
| $a_{min}$ | $b_{min}$ | | Minimum bytes |
| $a_u$ | $b_u$ | | Mean bytes |
| $a_\sigma$ | $b_\sigma$ | | Standard deviation |
| $a_{1q}$ | $b_{1q}$ | | First quartile |
| $a_{2q}$ | $b_{2q}$ | | Second quartile |
| $a_{3q}$ | $b_{3q}$ | | Third quartile |
| $a_{us}$ | $b_{us}$ | | Total variation |
| $a_h$ | $b_h$ | | Homogeneity (amax = 1) (amin + 1) |
| $a_p$ | $b_p$ | | Lag-1 autocorrelation |
| $p_1(a_1 \ldots {}_n, b_1 \ldots {}_n)$ | | | Spearman's Rank Correlation |
| $p_2(b_1 \ldots {}_{n-1}, a_2 \ldots {}_n)$ | | | Spearman's Rank Correlation with Lag 1 |

Once a-b-t traces have been obtained, this collection of data may be used for workload modeling and generation in a variety of ways. If the goal is to simply reproduce the workload represented, then one may simply "replay" the traces at the socket application programming interface (API) with the same sequence of start times that preserves both the order and initiation time of the TCP connections. Another straightforward modeling approach is to derive the distributions for the key random variables that characterize applications at the source level (e.g., distributions of ADU sizes, time values, number of epochs, etc.) from data collected. These distributions can be used to populate analytic or empirical models of the workload in much the same way as has been done for application-specific models. However, the simple structure of the a-b-t trace makes it a flexible tool for a broader range of modeling and generation approaches. For example, a "representative" workload for an entire network can be modeled by processing traces from several links in the network to produce their a-b-t representation and pooled into a "library" of TCP connection vectors. From this library, random samples may be drawn to create a new trace that would model the aggregate workload. To generate this workload in a simulation, start times for each TCP connection could be assigned according to some model of connection arrivals. For example, the recorded start times for TCP connections could be replaced with start times randomly selected from a given distribution of inter-arrival times in order to study the effects of changes in the connection arrival process. Other possible transforms include replacing the recorded ADU sizes with sizes drawn from analytic distributions (e.g., lognormal) with different parameter settings. For example, all multi-epoch connections can be replaced with single-epoch connections where the new a and b values are the sums of the original a and b values and the t values are eliminated (this is similar to using NetFlow data to model TCP connections). All such transforms provide researchers with a powerful new tool to use in simulations for studying the effects of workload characteristics in networks.

Figure 11:
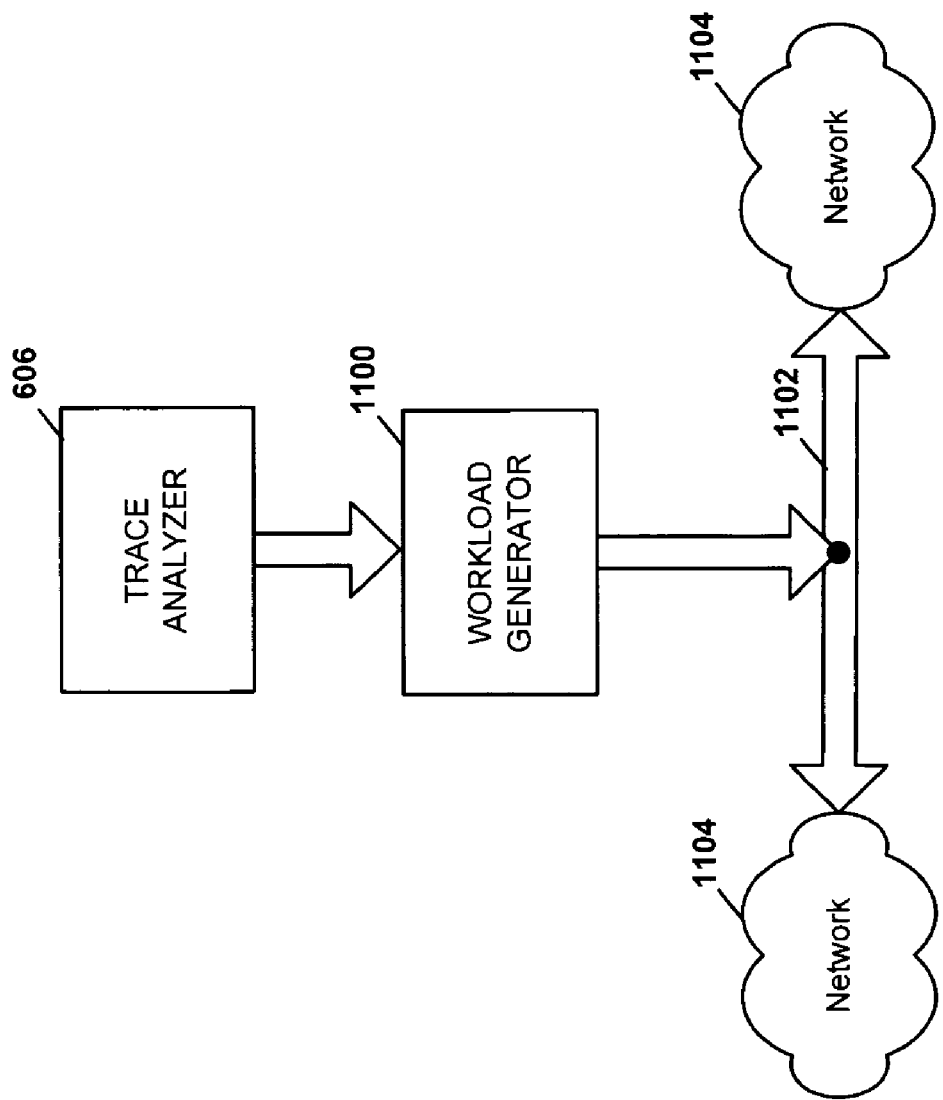
FIG. 11 is a block diagram and illustrating a system for generating simulated traffic that models application level traffic behavior in a real network according to an aspect of the subject matter disclosed herein.

FIG. 11 is a block diagram and illustrating a system for generating simulated traffic that models application level traffic behavior in a real network according to an aspect of the subject matter disclosed herein. A workload generator 1100 receives the simulated traffic data from trace analyzer 606 and generates simulated traffic flows and drives the traffic onto a link 1102 associated with one or more networks 1104. Workload generator 1100 may be, for example, a processor-based system running computer executable code. Workload generator 1100 reads each stored a-b-t trace $T=\{(T_i, C_i)\}$ from trace analyzer 606 to simulate each TCP connection at time $T_i$, and sends and receives data based on the corresponding connection vector $C_i$, which models the sources using that connection. The environment in which workload generator 1100 runs may have an interface to the transport layer (e.g., sockets) that can be used to initiate the (real or simulated) transmission of application data. For example, workload generator 1100 can access the transport layer via TCP agents that closely mirror the implementation of stream sockets in actual operating systems. Workload generator 1100 can send data to, and receive data from, agents in much the same manner as is done with sockets. Workload generator 1100 can use the socket interface in real operating systems to send streams of bytes. Workload generator 1100, for example, may comprise two instances of a program, each running on a processor-based system at the edge of a network and can replay an arbitrary a-b-t trace by establishing one TCP connection for each connection vector $C_i$ in the trace, with one instance of the program playing the role of the connection initiator and the other program the connection acceptor. To begin, the connection initiator performs a number of socket writes in order to send the number of bytes specified in a first data unit $a_1$. The other endpoint will read as many bytes as specified in the data unit $a_1$. In addition, the first data unit $a_1$ can be used synchronize the two instances of the program by including a 32-bit connection vector identifier in the first four bytes. Since this identifier is part of the content of the first data unit, the acceptor can uniquely identify the connection vector that is to be replayed in this new connection. If a is less than 4 bytes in length, the connection initiator will open the connection using a special port number designated for connections for which the identifier is provided by the connection acceptor. This approach guarantees that the two program instances always remain properly synchronized (i.e., they agree on the $C_i$ they replay within each TCP connection) even if connection establishment segments are lost or reordered.

For example, consider the replay of an a-b-t trace containing the connection vector, Ci=<(329, 403, 0.12), (403, 25821, 3.12), (356, 1198,Ø)> that corresponds to the TCP connection shown in FIG. 3A. At time $T_i$ the connection initiator establishes a new TCP connection to the connection acceptor. The initiator then writes 329 bytes to its socket and reads 403 bytes. Conversely, the connection acceptor reads 329 bytes from its socket and writes 403 bytes. After the initiator has read the 403 bytes, it sleeps for 120 milliseconds and then writes 403 bytes and reads 25,821 bytes. The acceptor reads 403 bytes and writes 25,821 bytes. After sleeping for 3,120 milliseconds, the third exchange of data units is handled in the same way and the TCP connection is terminated.

Figure 12:
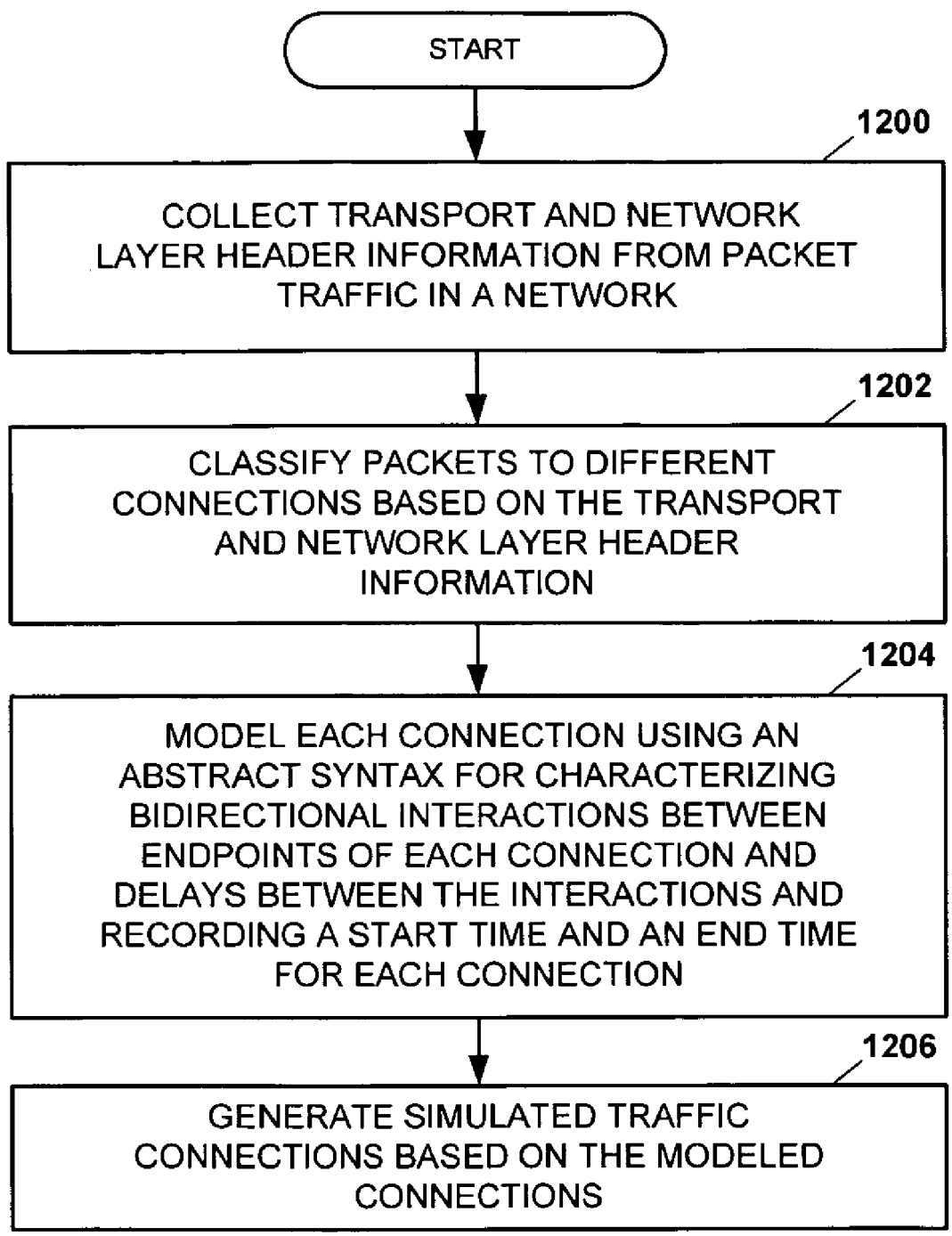
FIG. 12 is a flow diagram illustrating a method for generating simulated traffic that models application level traffic behavior in a real network according to an aspect of the subject matter described herein.

FIG. 12 is a flow diagram illustrating a method for generating simulated traffic that models application level traffic behavior in a real network according to an aspect of the subject matter described herein. In FIG. 12, transport and network layer header information is collected from packet traffic in a network in step 1200. In step 1202, packets are classified to different connections based on the transport and network layer header information. Each connection is modeled using an abstract syntax, such as the a-b-t model, for characterizing bidirectional interactions between endpoints of each connection and delays between the interactions and recording a start time and an end time for each connection in step 1204. Simulated traffic connections are generated based on the modeled connections in step 1206.

Once the a-b-t trace T={(Ti, Ci): i=1, ..., N} has been obtained, it may be used for synthetic traffic generation in a variety of ways. As described above, a trace may simply be replayed with the same sequence of start times, which preserves both the order and initiation time of the applications utilizing the measured link.

However, the simple structure of the a-b-t trace makes it a flexible tool for a broad range of generation tasks. T may be transformed in a variety of ways to produce new traces with different intrinsic and extrinsic properties. Taken together, these new traces can provide a diverse library of sources from which to generate synthetic traffic, with the choice of source depending on the experiment at hand.

One simple transformation of T is filtering. In filtering, one selects from T a subtrace T' consisting of all those connections satisfying a prespecified criterion, along with their associated start times. For example, an initial trace containing all the non-concurrent connections can be filtered to obtain a subtrace of all HTTP (port-80) connections. In a similar way, subtraces of ftp or SMTP connections can be created using port numbers as an identifier. These selection criteria are application specific, but one may also choose connections having more general properties, such a large number of epochs, or an unequal distribution of a- and b-type ADUs. We note that while port-based filtering can be carried out at the packet level, more sophisticated filtering based on application level connection features requires an a-b-t trace or similar information.

Another simple transformation that is frequently employed in this work is scaling. Formally, for any scale factor $\alpha > 0$, the alpha-rescaled version of T is defined by replacing each initiation time $T_i$ by $\alpha T_i$, resulting in a new trace $T_{60} = \{(\alpha T_i, C_i): i=1, \ldots, N\}$. The initial trace has scale $\alpha = 1$. When $\alpha < 1$, connection arrivals are sped up and when $\alpha > 1$, connection arrivals are slowed down. For example $\alpha = 1/2$ and $\alpha = 2$ correspond, respectively, to doubling and halving the arrival rate.

Scaling affects only the initiation times of connections; the connections themselves are unaffected. In particular, altering the connection arrival rate does not change inter-epoch think times, and its effect on the transmission rate of individual data units will depend on external factors like link capacity and congestion. Scaling changes connection arrivals without changing connections, which can be referred to as the "connection invariance" property.

In trace replay experiments, it is often necessary to reproduce different synthetic traffic loads on a link or network of interest. This is particularly important in experiments designed to compare and validate active queue management schemes, as running links near capacity is a key factor in distinguishing effective methods.

Scaling provides a simple means to increase or decrease the average link load in a trace replay experiment: decreasing a will in-crease the average load on a link, while increasing a will decrease the average load. In particular, scaling enables the use of a single a-b-t trace to reproduce realistic application level traffic at a variety of average loads. In the same way, scaling lets us adapt an a-b-t trace recorded under particular load conditions to an experiment where different load conditions are more appropriate.

Even on an uncongested link, the connection between the scale factor a and the average load (bytes per unit time) resulting from replay of a scaled trace $T_\alpha$ may not necessarily be linear as a consequence of connection invariance: the effect of the interconnection data units and think times on the load may not be captured by the scale factor alone. As a consequence, in experiments attempting to achieve a desired average load on a link, a sequence of calibration experiments can be undertaken to identify the value of the scale parameter best suited to the task.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for determining application-level traffic characteristics in a network based on transport and network layer header information, the method comprising:
    (a) collecting transport and network layer header information from packet traffic in a network;
    (b) classifying packets to different connections based on the transport and network layer header information;
    (c) modeling each connection using an abstract syntax for characterizing bidirectional interactions between endpoints of each connection and delays between the interactions; and
    (d) determining application-level characteristics of the packet traffic based on the modeled connections.

2. The method of claim 1 wherein collecting transport and network layer header information from packet traffic in the network comprises collecting at least one of source identifying information, destination identifying information, a packet sequence number, and an acknowledgement number from each packet.

3. The method of claim 2 wherein classifying packets to different connections based on the transport and network layer header information comprises classifying packets according to a source IP address, a destination IP address, a source TCP port, and a destination TCP port.

4. The method of claim 2 wherein modeling each connection using an abstract syntax includes re-ordering packets and constructing application data units based on the re-ordered packets.

5. The method of claim 2 wherein modeling each connection using an abstract syntax includes disregarding repeated packets resulting from packets lost in the network based on at least one of the packet sequence number and the acknowledgment number from each packet.

6. The method of claim 2 wherein modeling each connection using an abstract syntax for characterizing bidirectional interactions between endpoints of each connection and delays between the interactions comprises:
    (i) determining a number of bytes of data associated with a first application data unit traveling in a first direction over the connection based on at least one of packet sequence numbers and acknowledgment numbers, the first application data unit including at least one data packet;

(ii) determining a number of bytes of data associated with a second application data unit traveling in a second direction over the connection based on the at least one of packet sequence numbers and acknowledgment numbers associated with the application data unit traveling in the first direction, the second application data unit including at least one data packet;

(iii) determining a delay between the second application data unit and a third application data unit based on timestamps indicating when associated transport and network layer header information was collected from packet traffic in a network; and (iv) modeling a connection based on the determine number of bytes of data associated with the first application data unit, the determine number of bytes of data associated with the second application data unit, and the determined delay.

7. The method of claim 6, wherein modeling a connection includes repeating steps (i)-(iv) to characterize a plurality of bidirectional interactions between the endpoints of the connection and delays between the interactions.

8. The method of claim 2 wherein modeling each connection using an abstract syntax for characterizing bidirectional interactions between endpoints of each connection and delays between the interactions comprises:

(i) modeling a first direction of a connection by:

determining a number of bytes of data associated with a first application data unit traveling in the first direction over the connection based on at least one of packet sequence numbers and acknowledgment numbers associated with the first application data unit, the first application data unit including at least one data packet;

determining a delay between the first application data unit traveling in the first direction and a subsequent application data unit traveling in a second direction, opposite the first direction, based on timestamps indicating when associated transport and network layer header information was collected from packet traffic in a network, and modeling the first direction of the connection based on the determined number of bytes of data associated with the first application data unit and the determined delay between the first application data unit and the subsequent application data unit traveling in the second direction (ii) modeling a second direction of the connection by:

determining a number of bytes of data associated with a second application data unit traveling in the second direction over the connection based on at least one of packet sequence numbers and acknowledgment numbers associated with the second application data unit, the second application data unit including at least one data packet;

determining a delay between the second application data unit traveling in the second direction and a subsequent application data unit traveling in the first direction based on timestamps indicating when associated transport and network layer header information was collected from packet traffic in the network, and modeling the second direction of the connection based on the determined number of bytes of data associated with the second application data unit and the determined delay between the second application data unit and the subsequent application data unit traveling in the first direction.

9. The method of claim 8, wherein modeling a connection includes repeating steps (i) and (ii) to characterize a plurality of bidirectional interactions between the endpoints of the connection and delays between the interactions.

10. The method of claim 1 wherein determining application-level characteristics of the packet traffic based on the modeled connections comprises:

(a) generating feature vectors for each modeled connection;

(b) applying statistical cluster analysis to the feature vectors to group similar connections together; and (c) selecting one or more connections from each group to represent application-level characteristics of the group.

11. The method of claim 1 wherein determining application-level characteristics of the packet traffic based on the modeled connections comprises determining whether data concurrency exists on a connection based on sequence numbers and acknowledgment numbers of packets.

12. The method of claim 11 wherein determining whether data-concurrency exists on a connection comprises comparing a sequence number of a packet sent from a first endpoint of the connection to a second endpoint of the connection with an acknowledgement number of a packet sent from the second endpoint of the connection to the first endpoint of the connection.

13. A method for generating simulated traffic that models application level traffic behavior in a real network, the method comprising:

(a) collecting transport and network layer header information from packet traffic in a network;

(b) classifying packets to different connections based on the transport and network layer header information;

(c) modeling each connection using an abstract syntax for characterizing bidirectional interactions between endpoints of each connection and delays between the interactions and recording a start time and an end time for each connection; and (d) generating simulated traffic connections based on the modeled connections.

14. The method of claim 13 wherein collecting transport and network layer header information from packet traffic in the network comprises collecting at least one of source identifying information, destination identifying information, a packet sequence number, and an acknowledgement number from each packet.

15. The method of claim 14 wherein classifying packets to different connections based on the transport and network layer header information comprises classifying packets according to a source IP address, a destination IP address, a source TCP port, and a destination TCP port.

16. The method of claim 14 wherein modeling each connection using an abstract syntax includes re-ordering packets and constructing application data units based on the re-ordered packets.

17. The method of claim 14 wherein modeling each connection using an abstract syntax includes disregarding repeated packets resulting from packets lost in the network based on at least one of the packet sequence number and the acknowledgment number from each packet.

18. The method of claim 14 wherein modeling each connection using an abstract syntax for characterizing bidirectional interactions between endpoints of each connection and delays between the interactions comprises:

(i) determining a number of bytes of data associated with a first application data unit traveling in a first direction over the connection based on at least one of packet sequence numbers and acknowledgment numbers, the first application data unit including at least one data packet;

(ii) determining a number of bytes of data associated with a second application data unit traveling in a second direction over the connection based on the at least one of packet sequence numbers and acknowledgment numbers associated with the application data unit traveling in the first direction, the second application data unit including at least one data packet;

(iii) determining a delay between the second application data unit and a third application data unit based on timestamps indicating when associated transport and network layer header information was collected from packet traffic in a network; and (iv) modeling a connection based on the determine number of bytes of data associated with the first application data unit, the determine number of bytes of data associated with the second application data unit, and the determined delay.

19. The method of claim 18, wherein modeling a connection includes repeating steps (i)-(iv) to characterize a plurality of bidirectional interactions between the endpoints of the connection and delays between the interactions.

20. The method of claim 14 wherein modeling each connection using an abstract syntax for characterizing bidirectional interactions between endpoints of each connection and delays between the interactions comprises:

(i) modeling a first direction of a connection by:
determining a number of bytes of data associated with a first application data unit traveling in the first direction over the connection based on at least one of packet sequence numbers and acknowledgment numbers associated with the first application data unit, the first application data unit including at least one data packet;

determining a delay between the first application data unit traveling in the first direction and a subsequent application data unit traveling in a second direction, opposite the first direction, based on timestamps indicating when associated transport and network layer header information was collected from packet traffic in a network, and modeling the first direction of the connection based on the determined number of bytes of data associated with the first application data unit and the determined delay between the first application data unit traveling in the first direction and the subsequent application data unit traveling in the second direction (ii) modeling a second direction of the connection by:
determining a number of bytes of data associated with a second application data unit traveling in the second direction over the connection based on at least one of packet sequence numbers and acknowledgment numbers associated with the second application data unit, the second application data unit including at least one data packet;

determining a delay between the second application data unit traveling in the second direction and a subsequent application data unit traveling in the first direction based on timestamps indicating when associated transport and network layer header information was collected from packet traffic in the network, and modeling the second direction of the connection based on the determined number of bytes of data associated with the second application data unit traveling in the second direction and the determined delay between the second application data unit and the subsequent application data unit traveling in the first direction.

21. The method of claim 20, wherein modeling a connection includes repeating steps (i)-(ii) to characterize a plurality of bidirectional interactions between the endpoints of the connection and delays between the interactions.

22. The method of claim 13 wherein generating simulated traffic connections based on the modeled connections comprises:

(a) establishing a new TCP connection between a first end point and a second endpoint;

(b) sending first data to the first endpoint, the first data having a number of bytes of data corresponding to the determined number of bytes of data associated with the first application data unit;

(c) sending second data to the second endpoint, the second data having a number of bytes of data corresponding to the determined number of bytes of data associated with the second application data unit; and (d) delaying sending additional data on the new TCP connection for a period of time corresponding to the determined delay between the second application data unit and the third application data unit.

23. The method of claim 13, comprising adding simulated network delays to the simulated traffic connections.

24. The method of claim 13, wherein generating simulated traffic connections based on the modeled connections includes filtering the modeled connections to generate a subset of the simulated traffic connections.

25. The method of claim 13, wherein generating simulated traffic connections based on the modeled connections includes scaling connection arrival times to generate simulated traffic connections based on a scaled factor of the modeled connections.

26. A computer readable medium encoded with computer executable instructions for performing steps comprising:

(a) collecting transport and network layer header information from packet traffic in a network;

(b) classifying packets to different connections based on the transport and network layer header information;

(c) modeling each connection using an abstract syntax for characterizing bidirectional interactions between endpoints of each connection and delays between the interactions; and (d) determining application-level characteristics of the packet traffic based on the modeled connections.

27. A computer readable medium encoded with computer executable instructions for performing steps comprising:

(a) collecting transport and network layer header information from packet traffic in a network;

(b) classifying packets to different connections based on the transport and network layer header information;

(c) modeling each connection using an abstract syntax for characterizing bidirectional interactions between endpoints of each connection and delays between the interactions and recording a start time and an end time for each connection; and (d) generating simulated traffic connections based on the modeled connections.

28. The computer readable medium of claim 27 wherein generating simulated traffic connections based on the modeled connections comprises:

(a) establishing a new TCP connection between a first endpoint and a second endpoint;

(b) sending first data to the first endpoint, the first data having a number of bytes of data corresponding to the determined number of bytes of data associated with the first application data unit;

(c) sending second data to the second endpoint, the second data having a number of bytes of data corresponding to the determined number of bytes of data associated with the second application data unit; and (d) delaying sending additional data on the new TCP connection for a period of time corresponding to the determined delay between the second application data unit and the third application data unit.

29. A system for determining application-level traffic characteristics in a network based on transport and network layer header information, the system comprising:

(a) logic configured to collect transport and network layer header information from packet traffic in a network;

(b) logic configured to classify packets to different connections based on the transport and network layer header information;

(c) logic configured to model each connection using an abstract syntax for characterizing bidirectional interactions between endpoints of each connection and delays between the interactions; and (d) logic configured to determine application-level characteristics of the packet traffic based on the modeled connections.

30. A system for generating simulated traffic that models application level traffic behavior in a real network, the system comprising:

(a) logic configured to collect transport and network layer header information from packet traffic in a network;

(b) logic configured to classify packets to different connections based on the transport and network layer header information;

(c) logic configured to model each connection using an abstract syntax for characterizing bidirectional interactions between endpoints of each connection and delays between the interactions and recording a start time and an end time for each connection; and (d) logic configured to generate simulated traffic connections based on the modeled connections.

31. The system of claim 30 wherein the logic configured to generate simulated traffic connections based on the modeled connections:

(a) establishes a new TCP connection between a first endpoint and a second endpoint;

(b) sends first data to the first endpoint, the first data having a number of bytes of data corresponding to the determined number of bytes of data associated with the first application data unit;

(c) sends second data to the second endpoint, the second data having a number of bytes of data corresponding to the determined number of bytes of data associated with the second application data unit; and (d) delays sending additional data on the new TCP connection for a period of time corresponding to the determined delay between the second application data unit and the third application data unit.

32. A system for determining application-level traffic characteristics in a network based on transport and network layer header information, the system comprising:

(a) a packet trace monitor that collects transport and network layer header information from packet traffic in a network; and (b) a packet trace analyzer packets that classifies packets to different connections based on the transport and network layer header information, models each connection using an abstract syntax for characterizing bidirectional interactions between endpoints of each connection and delays between the interactions, and determines application-level characteristics of the packet traffic based on the modeled connections.

33. A system for generating simulated traffic that models application level traffic behavior in a real network, the system comprising:

(a) a packet trace monitor that collects transport and network layer header information from packet traffic in a network;

(b) a packet trace analyzer packets that classifies packets to different connections based on the transport and network layer header information and models each connection using an abstract syntax for characterizing bidirectional interactions between endpoints of each connection and delays between the interactions and records a start time and an end time for each connection; and (c) a workload generator that generates simulated traffic connections based on the modeled connections.

34. The system of claim 33 wherein the workload generator:

(a) establishes a new TCP connection between a first endpoint and a second endpoint;

(b) sends first data to the first endpoint, the first data having a number of bytes of data corresponding to the determined number of bytes of data associated with the first application data unit;

(c) sends second data to the second endpoint, the second data having a number of bytes of data corresponding to the determined number of bytes of data associated with the second application data unit; and (d) delays sending additional data on the new TCP connection for a period of time corresponding to the determined delay between the second application data unit and the third application data unit.

* * * * *